United States Patent
Lin

(10) Patent No.: US 9,256,259 B2
(45) Date of Patent: Feb. 9, 2016

(54) ELECTRONIC APPARATUS

(71) Applicant: WISTRON CORP., New Taipei (TW)

(72) Inventor: Shih-Jeh Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 244 days.

(21) Appl. No.: 14/163,740

(22) Filed: Jan. 24, 2014

(65) Prior Publication Data

US 2014/0240250 A1   Aug. 28, 2014

(30) Foreign Application Priority Data

Feb. 27, 2013   (TW) .............................. 102106915 A

(51) Int. Cl.
   *G06F 1/16*   (2006.01)

(52) U.S. Cl.
   CPC ............ *G06F 1/1683* (2013.01); *G06F 1/1613* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 5,706,030 A * | 1/1998 | Ishigami | ................ | B41J 3/4075 345/168 |
| 6,108,200 A * | 8/2000 | Fullerton | .............. | G06F 1/1632 235/14 R |
| 6,952,340 B2 * | 10/2005 | Son | ........................ | G06F 1/1626 312/223.2 |
| 7,542,052 B2 * | 6/2009 | Solomon | ............... | G06F 1/1601 345/156 |
| 8,498,100 B1 * | 7/2013 | Whitt, III | .............. | G06F 1/1618 361/679.17 |
| 8,519,962 B2 * | 8/2013 | Han | ...................... | G06F 1/1626 345/169 |
| 8,659,889 B2 * | 2/2014 | Dolci | .................... | G06F 1/1632 361/679.41 |
| 9,176,537 B2 * | 11/2015 | Sharma | ................. | G06F 1/1669 |
| 2003/0048256 A1 * | 3/2003 | Salmon | ................. | G06F 1/1613 345/168 |
| 2009/0102744 A1 * | 4/2009 | Ram | ..................... | G06F 1/1601 345/1.1 |
| 2010/0238620 A1 * | 9/2010 | Fish | ...................... | G06F 1/1616 361/679.09 |
| 2010/0271771 A1 * | 10/2010 | Wu | ........................ | G06F 1/1616 361/679.17 |
| 2010/0321877 A1 * | 12/2010 | Moser | ................... | G06F 1/1616 361/679.29 |
| 2012/0194448 A1 * | 8/2012 | Rothkopf | ............. | A45C 13/002 345/173 |
| 2012/0268395 A1 | 10/2012 | Wang et al. | | |
| 2014/0111929 A1 * | 4/2014 | Andre | ................... | G06F 1/1656 361/679.27 |

FOREIGN PATENT DOCUMENTS

| | | |
|---|---|---|
| TW | M419988 U1 | 1/2012 |
| TW | M425307 U1 | 3/2012 |
| TW | I377476 | 11/2012 |

* cited by examiner

*Primary Examiner* — Lisa Lea Edmonds
(74) *Attorney, Agent, or Firm* — Li & Cai Intellectual Property (USA) Office

(57) ABSTRACT

An electronic apparatus includes a touch-control socket device and a display device. The touch-control socket device includes a socket and a touch-control glass. The socket has a seat, a frame extended from the seat, and a connecting module disposed in the seat. The seat has a first insertable opening and a second insertable opening respectively facing two different directions. The touch-control glass is fixed on the frame and electrically connected to the connecting module. The touch-control glass has a first surface and an opposite second surface. When an electrical connector of the display device inserts into the connecting module through the first insertable opening, the first surface is used as a touch-control interface. When the electrical connector of the display device inserts into the connecting module through the second insertable opening, the second surface is served as a touch interface.

17 Claims, 9 Drawing Sheets

ELECTRONIC APPARATUS

BACKGROUND OF THE DISCLOSURE

1. Field of the Disclosure

The instant disclosure relates to an electronic apparatus; more particular, to an electronic apparatus capable of touch-control adjustments according to users' demand.

2. Description of Related Art

The conventional touch-control glass is adhered to the display device to form the well-known tablet PC such that the user can operate the tablet PC by touching the outer surface of the adhered touch-control glass. However, the adhered structure of the touch-control glass and the display device has limited the application of the touch-control glass and generated inconvenient problems. For example, when a lot of text is inputted into the tablet PC, the tablet PC must connect with an extra keyboard. Alternatively, when the tablet PC is set at a specific viewing angle, the tablet PC usually requires a foldable casing to maintain the tablet PC at the specific viewing angle by supporting and folding the foldable casing.

To achieve the abovementioned improvement, the inventors strive through industrial experience and academic research to present the instant disclosure, which can provide additional improvement as mentioned above.

SUMMARY OF THE DISCLOSURE

One embodiment of the instant disclosure provides an electronic apparatus having a touch-control glass capable of an adjustable application mode different from the past, in other words, two opposite surfaces of the touch-control glass can be selectively applied as a touch-control interface.

The electronic apparatus comprises a touch-control socket device and a display device. The touch-control socket device includes a socket and a touch-control glass. The socket has a seat, a frame extended from the seat, a connecting module disposed in the seat, in which the seat has a first insertable opening and a second insertable opening facing two different directions. The touch-control glass is fixed on the frame and electrically connected to the connecting module. The touch-control glass has a first surface and an opposite second surface. The display device defines a viewable portion and has an electrical connector selectively inserted through the first insertable opening or the second insertable opening and into the connecting module. When the electrical connector is inserted into the connecting module through the first insertable opening, the display device is configured in parallel with and overlaps the touch-control glass. The second surface of the touch-control glass substantially superimposes the viewable portion of the display device such that the first surface of the touch-control glass can be a touch-control interface. When the electrical connector is inserted into the connecting module through the second insertable opening, the display device and the touch-control glass are configured with a specific angle therebetween such that the first surface of the touch-control glass can be disposed on a working surface and the second surface of the touch-control glass can be a touch-control interface.

Base on the above, the electronic apparatus of the instant disclosure discloses the display device which is selectively inserted through the first insertable opening or the second insertable opening and into the connecting module of the touch-control socket device. As a result, the first or the second surfaces of the touch-control glass is selectively used as a touch-control interface which provides two different usage modes for the electronic apparatus.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

First Embodiment

Figure 1:
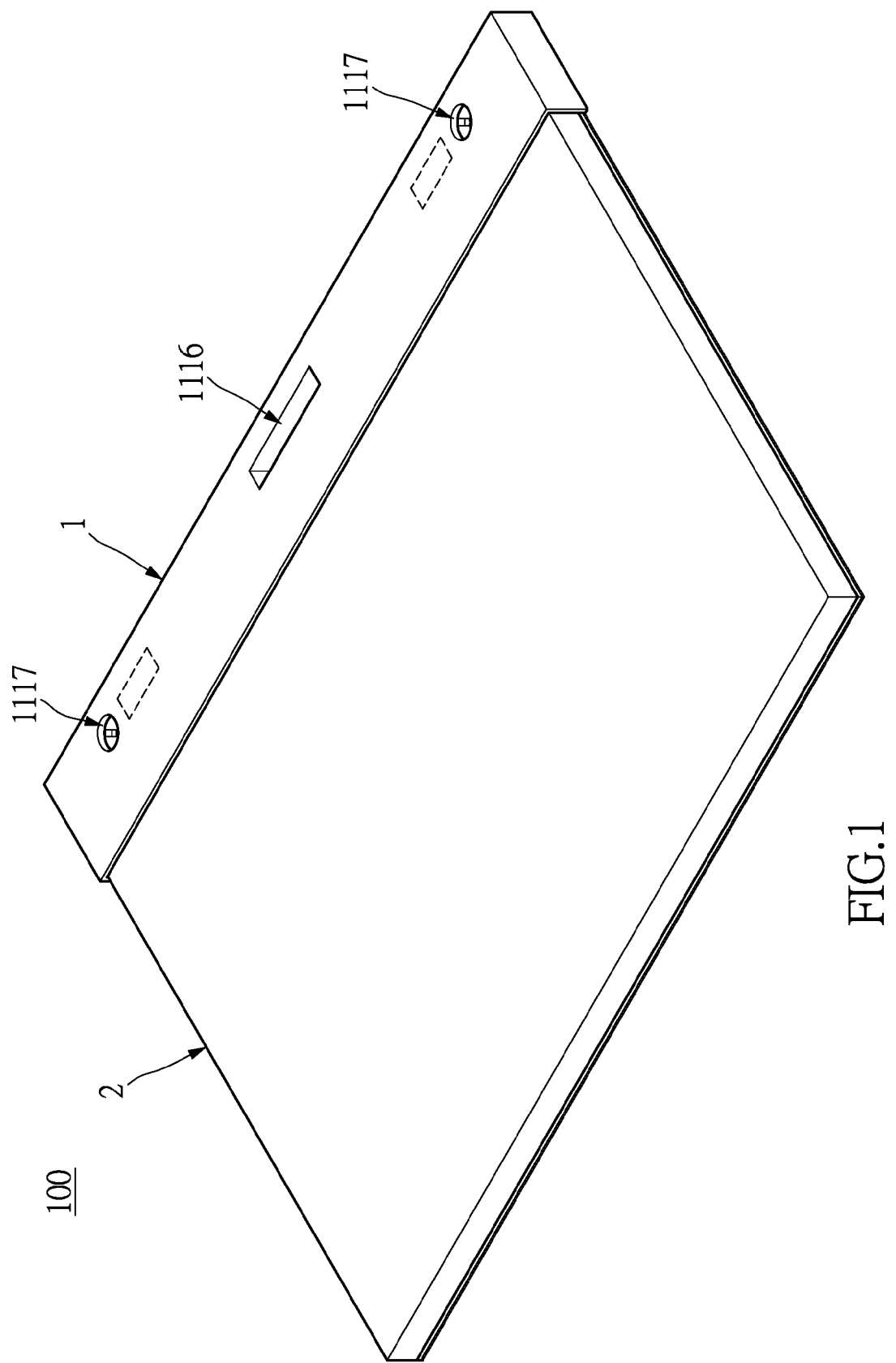
FIG. 1 is a perspective view showing a first embodiment of an electronic apparatus according to the instant disclosure, in which the electronic apparatus is in a tablet PC mode.

Please refer to FIG. 1, which shows a first embodiment of the instant disclosure. The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity. The instant embodiment provides an electronic apparatus 100 including a touch-control socket device 1 and a display device 2 insertable into the touch-control socket device 1. The following description discloses the elements of the electronic apparatus 100 firstly, and then discloses the relationship between the elements.

Figure 2:
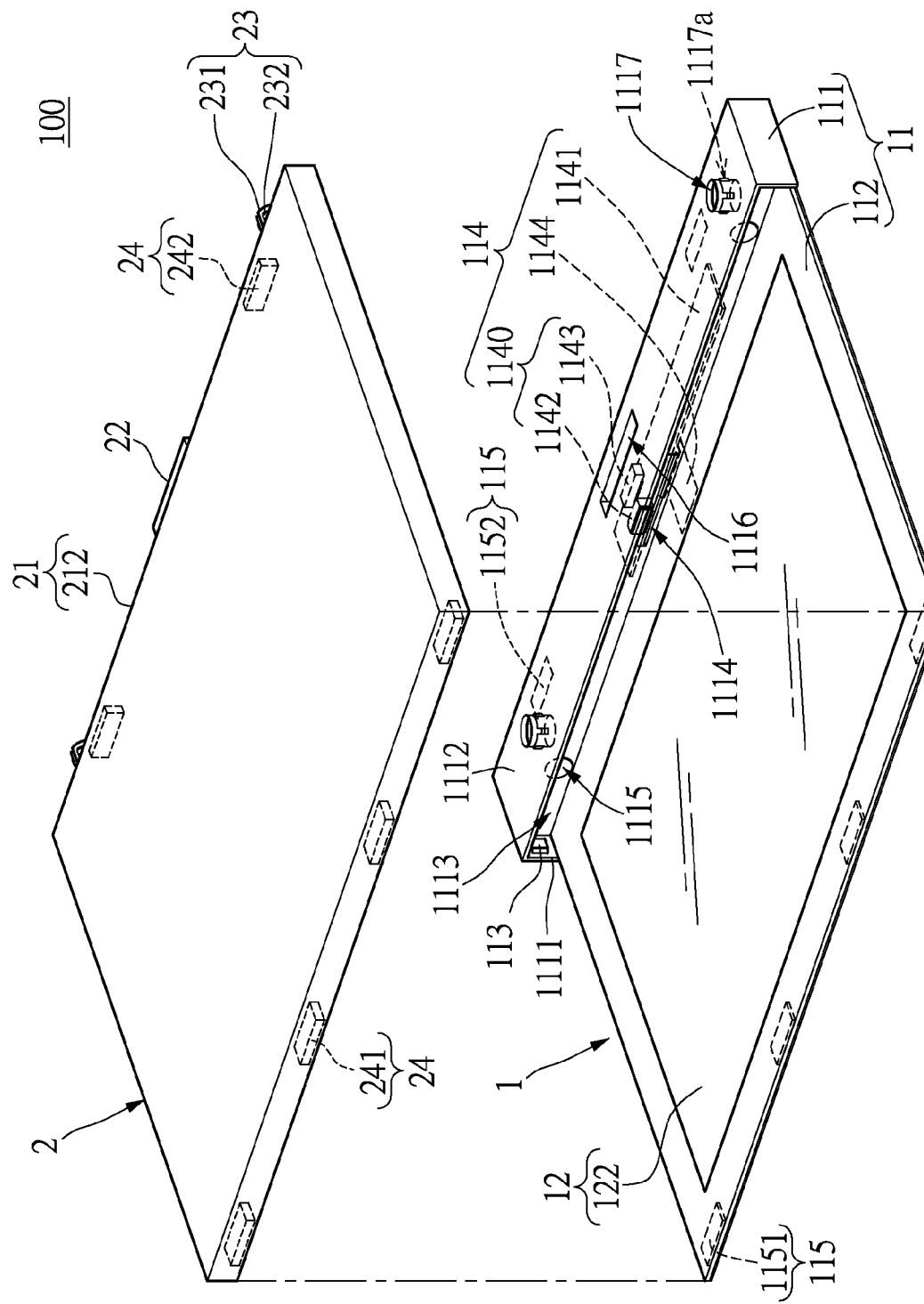
FIG. 2 is an exploded view of FIG. 1.
Figure 3:
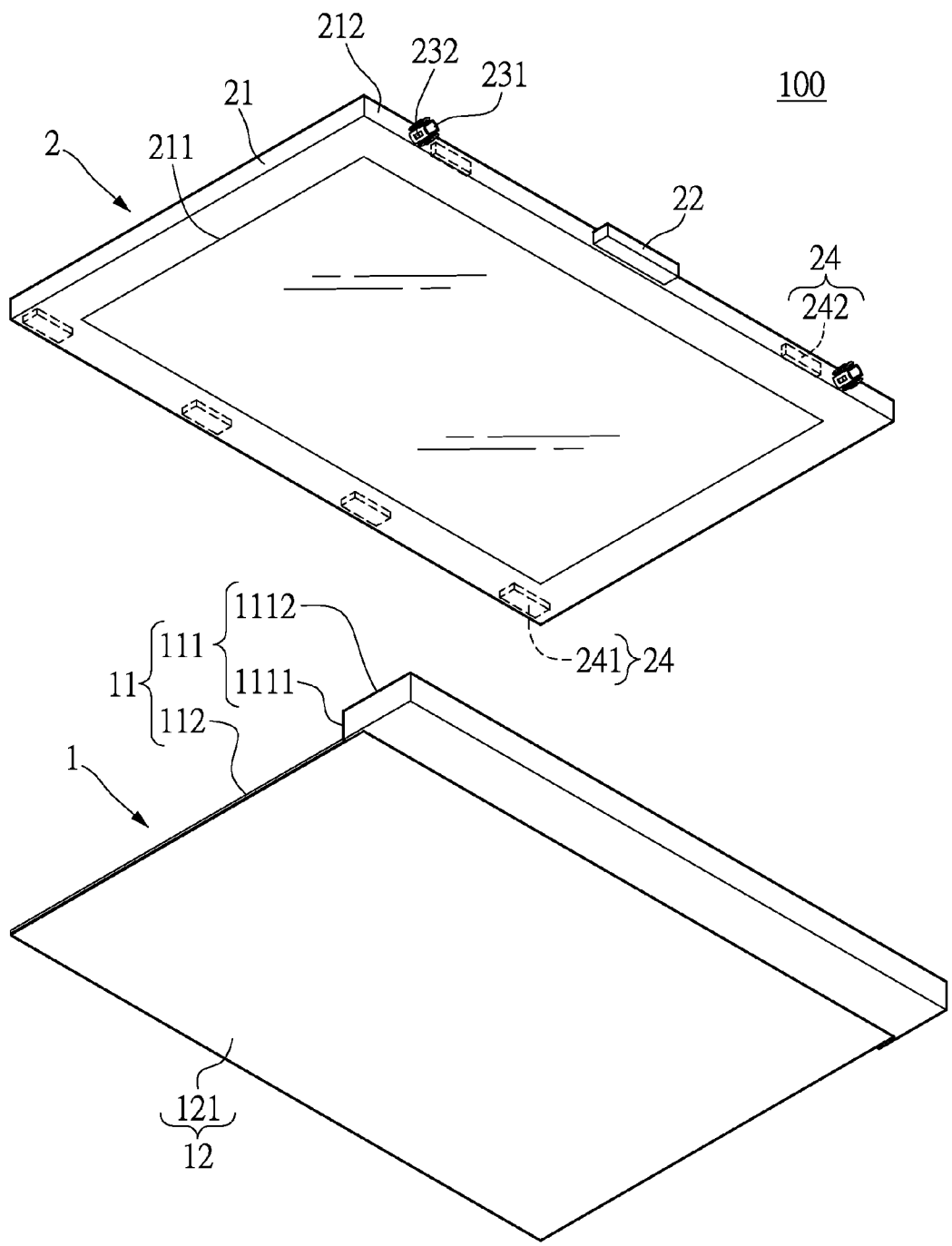
FIG. 3 is an exploded view of FIG. 1 with a different viewing angle.
Figure 4:
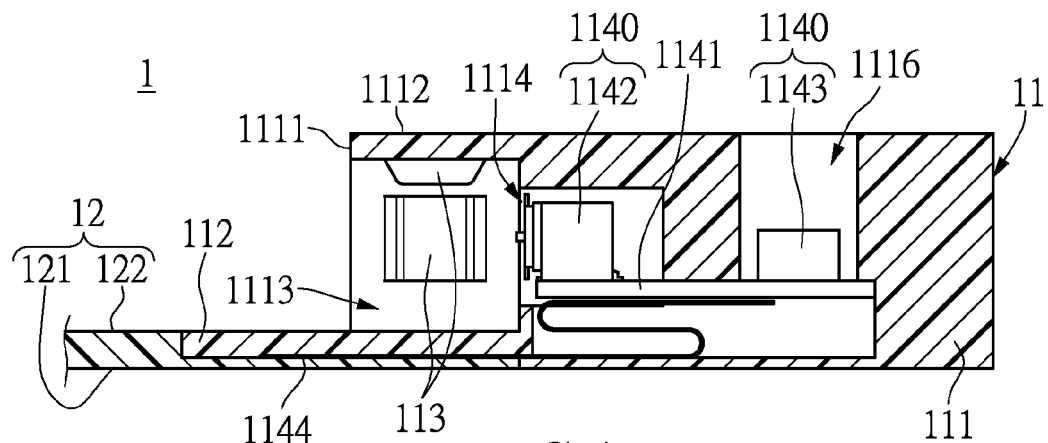
FIG. 4 is a cross-sectional view showing a touch-control socket device of the electronic apparatus according to the first embodiment of the instant disclosure.
Figure 5:
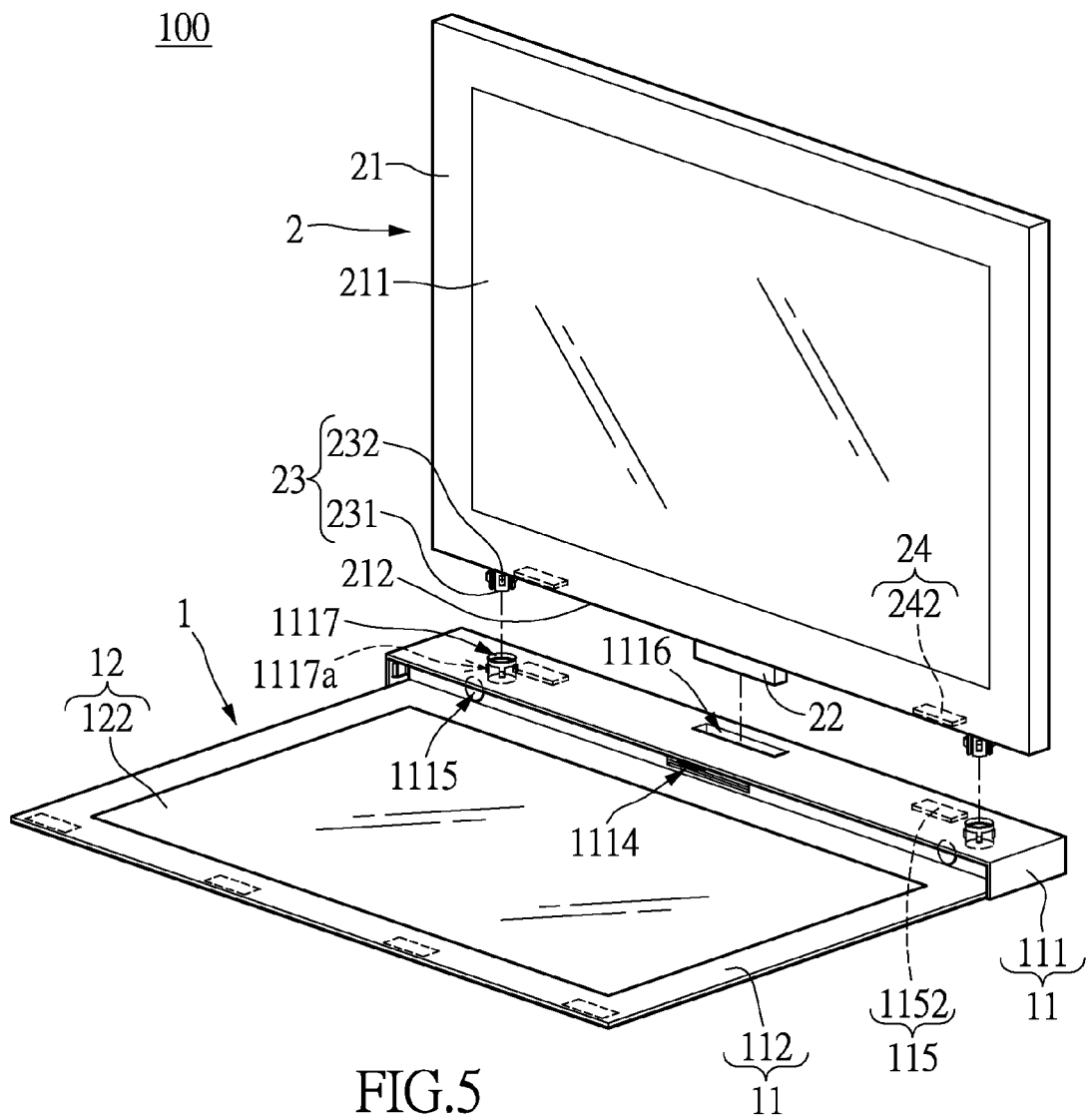
FIG. 5 is an exploded view showing the first embodiment of the electronic apparatus according to the instant disclosure, in which the electronic apparatus is in a notebook PC mode.

Please refer to FIGS. 2 through 4 which show the touch-control socket device 1 including a socket 11 and a touch-control glass 2. The socket 11 has a seat 111, a frame 112 integrally formed and extended from the seat 111, a plurality of buffering pads 113, a circuit unit 114 disposed inside the seat 111, and a magnetic unit 115 disposed on the seat 111 and the frame 112. The buffering pad 113 can be made of foam, rubber, silicon, or the other material having a buffering or shock-absorbing property.

Specifically, the seat 11 is a substantially a rectangle, and two adjacent elongated surfaces of the seat 11 are respectively defined as a first elongated surface 1111 and a second elongated surface 1112. The seat 11 has a rectangular inserted slot 1113 formed on the first elongated surface 1111. The inserted slot 1113 has a first insertable opening 1114 and two first positioning slots 1115 formed at a bottom portion thereof. The first insertable opening 1114 is arranged at the center of the bottom portion of the inserted slot 1113, and the first positioning slots 1115 are respectively and symmetrically arranged at two opposite ends of the first insertable opening 1114 (e.g., the ends to the left and right of the first insertable opening 1114 as shown in FIG. 2). The distance between one of the first positioning slots 1115 and the first insertable opening 1114 is equal to the distance between another first positioning slot 1115 and the first insertable opening 1114. The buffering pads 113 are disposed on (e.g., adhered to) an inner lateral side wall of the inserted slot 1113. The seat 111 has a second insertable opening 1116 and two second positioning slots 1117 formed on the second elongated surface 1112. The second insertable opening 1116 is arranged at a center portion of the second elongated surface 1112, and the second positioning slots 1117 are respectively arranged at two opposite ends of the second insertable opening 1116 (e.g., the ends to the left and the right of the second insertable opening 1116 as shown in FIG. 2). The distance between one of the second positioning slots 1117 and the second insertable opening 1116 is equal to the distance between another second positioning slot 1117 and the second insertable opening 1116.

Figure 6:
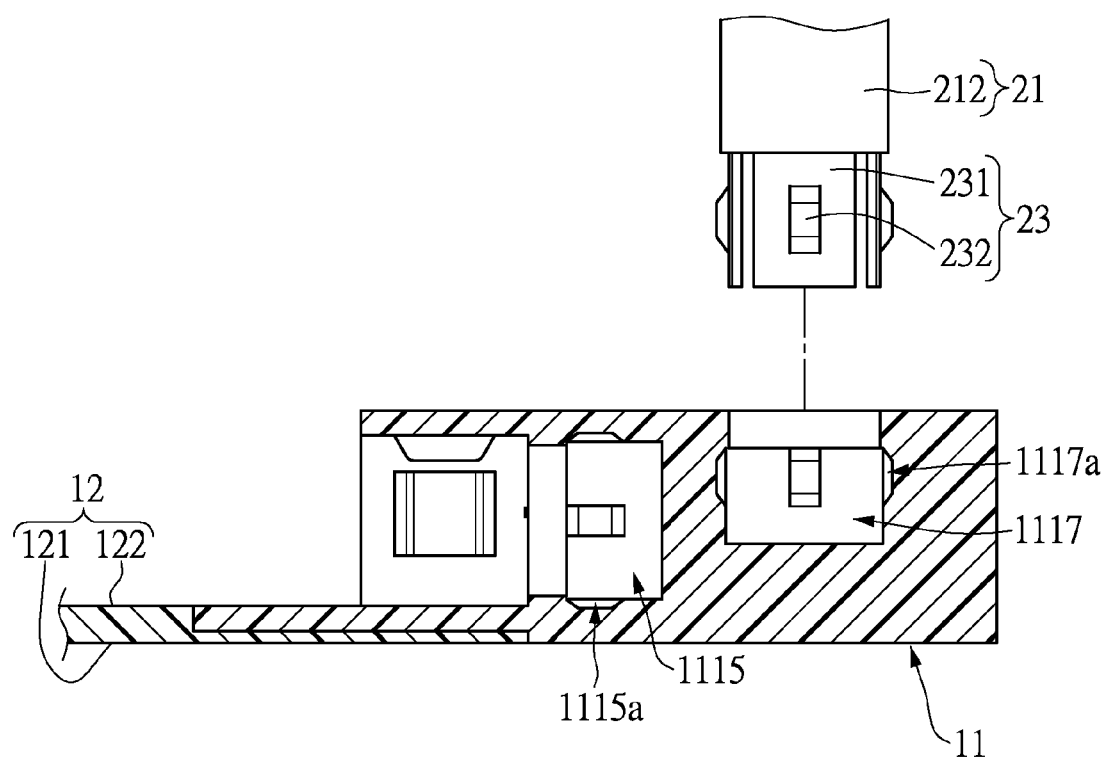
FIG. 6 is a cross-sectional view of FIG. 5.
Figure 7:
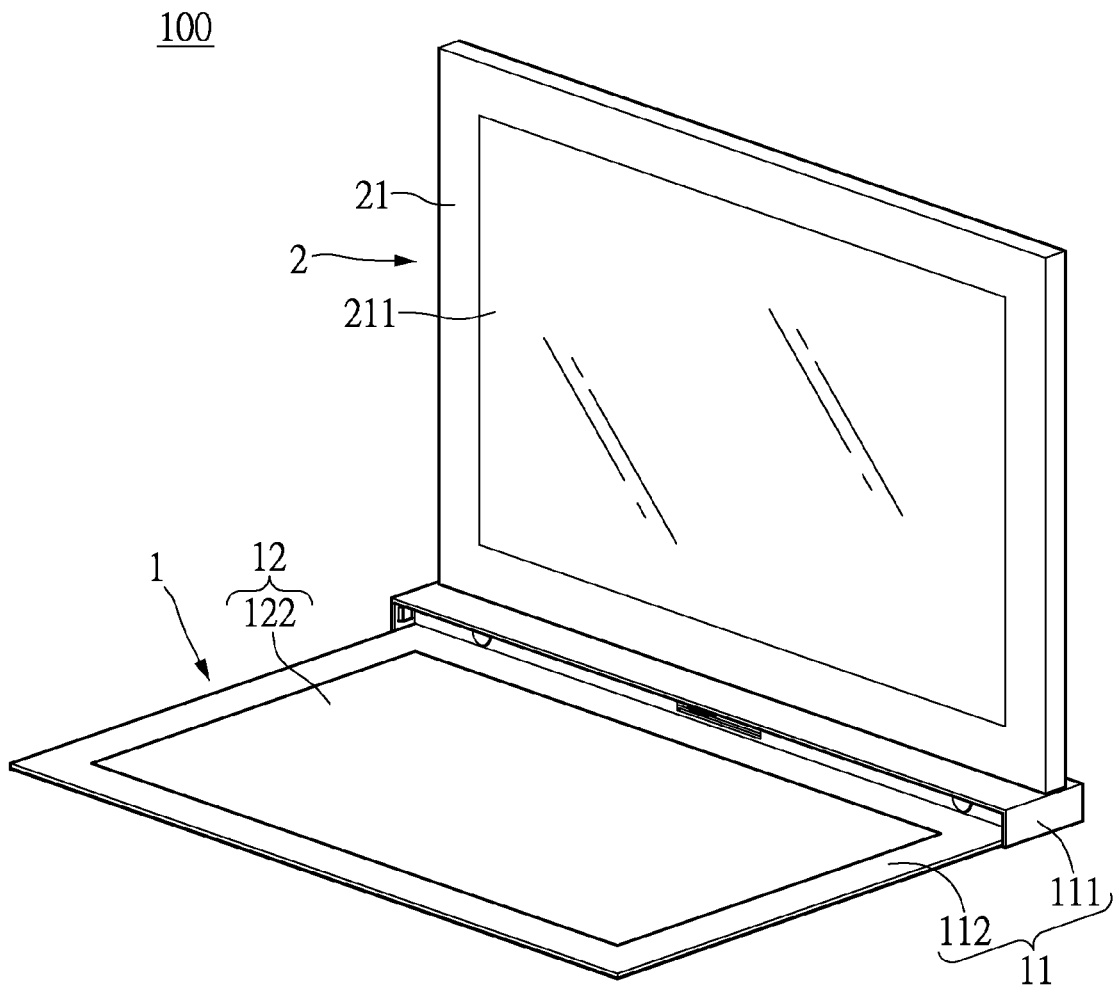
FIG. 7 is a perspective view showing the first embodiment of the electronic apparatus according to the instant disclosure, in which the electronic apparatus is in the notebook PC mode.

The first insertable opening 1114 and the second insertable opening 1116 respectively face two different directions intersecting at a ninety degrees angle. The distance between the first positioning slots 1115 and the first connector 1142 is equal to the distance between each second positioning slot 1117 and the second connector 1143. The construction of each first positioning slot 1115 is identical to the construction of each second positioning slot 1117. Each of the first positioning slots 1115 and each of the second positioning slots 1117 respectively has four notches 1115a (as shown in FIG. 6), 1117a formed on an inner wall thereof. Any two adjacent notches 1115a are configured with an predetermined distance therebetween, and any two adjacent notches 1117a are also configured with an predetermined distance therebetween.

The frame 112 substantially has a square-ring shape and is integrally formed and extended from a portion of the first elongated surface 1111 away from the second elongated surface 1112, and the extending direction of the frame 112 is substantially parallel to the second elongated surface 1112.

The circuit unit 114 has a circuit board 1141, a connecting module 1140 installed on the circuit board 1141, and a transmission wire 1144 connected to the circuit board 1141. The circuit board 1141 is disposed in the seat 111. The connecting module 1140 has a first connector 1142 and a second connector 1143. The first connector 1142 is exposed from the first insertable opening 1114, the second connector 1143 is exposed from the second insertable opening 1116, and an end portion of the transmission wire 1144 is protrudingly exposed from the seat 111. That is to say, the first connector 1142 is lain on the circuit board 1141, and the insertable opening of the first connector 1142 is aligned with the first insertable opening 1114. The second connector 1143 is formed upright on the circuit board 1141, and the insertable opening of the second connector 1143 is aligned the second insertable opening 1116. The direction in which the insertable openings of the first connector 1142 and the second connector 1143 is outwardly oriented at an angle of ninety degrees intersection. The magnetic unit 115 has a plurality of first magnetic members 1151 and a plurality of second magnetic members 1152. The first magnetic members 1151 are disposed at (e.g., embedded in) a portion of the frame 112 away from the seat 111, and the second magnetic members 1152 are disposed at (e.g., embedded in) the seat 111. The second magnetic members 1152 respectively flank the second connector 1143 (e.g., the left side and the right side of the second connector 1143 as shown in FIG. 2) for magnetic coupling to another device adjacent to the second elongate surface 1112.

The touch-control glass 12 in the instant embodiment is a transparent conductive electrode formed on a glass to provide a touch-control function for example, but in order to facilitate explanation of the instant embodiment, the transparent conductive electrode are not shown in the figures. The touch-control glass 12 is a transparent and rectangular plate which is fixed on the frame 112 of the seat 11. The touch-control glass 12 is connected to the exposed end portion of the transmission wire 1144 for electrical connection with the first connector 1142, the second connector 1143, and the circuit board 1141. The touch-control glass 12 has a first surface 121 and an opposite second surface 122. The first and the second surfaces 121, 122 of the touch-control glass 12 are selectively used as a touch-control interface. The area of the first surface 121 is larger than the area of the second surface 122. The periphery portion of the first surface 121 overlaps the frame 112, and the other portion of the first surface 121 overlaps the space surrounded by the frame 112. The second surface 122 is substantially arranged in the space surrounded by the frame 112. In other words, the perimeter of the first surface 121 is aligned with the outer perimeter of the frame 112 and the perimeter of the second surface 122 is substantially aligned with the inner perimeter of the frame 112.

The display device 2 in the instant embodiment only provides display function without any touch-control function, and in order to explain the instant embodiment conveniently, a simplified explanation is provided in regards to the display device 2 and the touch-control socket device 1. The display device 2 includes a main body 21 having a substantially rectangular shape, an electrical connector 22 and two positioning pillars 23 disposed on a side edge of the main body 21, and a mating magnetic unit 24 disposed at (e.g., embedded in) the main body 21.

A surface of the main body 21 is defined as a viewable portion 211, and one end portion of the main body 21 connected with the electrical connector 22 and the positioning pillars 23 is defined as an inserting end portion 212. The electrical connector 22 is connected to a center portion of the inserting end portion 212, and the electrical connector 22 is selectively inserted into the first connector 1142 or the second connector 1143.

Moreover, the positioning pillars 23 are respectively configured at two opposite ends of the electrical connector 22 (e.g., the upper left side and the lower right side of the electrical connector 22 as shown in FIG. 2) with the same distance. In other words, the positioning pillars 23 flank the electrical connector 22 with equal distance therebetween. The positioning pillars 23 respectively conform in shape to the first positioning slots 1115 (or the second positioning slots 1117). Specifically, each positioning pillar 23 has a plurality of elongated elastic arms 231 and a plurality of protrusions 232. Each elastic arm 231 is outwardly formed with one protrusion 232. The elastic arms 231 of each positioning pillar 23 are integrally extended from the inserting end portion 212 and configured in an annular array. Any two adjacent elastic arms 231 of each positioning pillar 23 are configured with a predetermined distance therebetween.

The mating magnetic unit 24 has a plurality of first mating magnetic members 241 and a plurality of second mating magnetic members 242. The first mating magnetic members 241 are disposed at (e.g., embedded in) another end portion of the main body 21 opposite to the inserting end portion 212, and the position and the number of first mating magnetic member 241 correspond to the position and the number of first magnetic member 1151. The second mating magnetic members 242 are disposed at (e.g., embedded in) the inserting end portion 212 and configured at two opposite ends of the electrical connector 22 (e.g., the upper left side and the lower right side of the electrical connector 22 as shown in FIG. 3). In other words, the second mating magnetic members 242 flank the electrical connector 22. The position and the number of second mating magnetic member 242 correspond to the position and the number of second magnetic member 1152.

Notably, the magnetic unit 115 and the mating magnetic unit 24 are formed to be magnetically coupled to each other, that is to say, the magnetic unit 115 and the mating magnetic unit 24 may be one made of magnet and another one made of iron, or both of them respectively made of magnets having opposite magnetisms, but are not limited to the instant embodiment.

The above description explains the touch-control socket device 1 and the display device 2, and the following description explains the relationship between the touch-control socket device 1 and the display device 2. The electrical connector 22 of the display device 2 is selectively inserted into the first connector 1142 or the second connector 1143.

Please refer to FIGS. 1 through 3, when the electrical connector 22 of the display device 2 is inserted into the first connector 1142 through the first insertable opening 1114, the display device 2 is configured in parallel with and overlaps the touch-control glass 12, and the second surface 122 of the touch-control glass 12 is substantially aligned with the viewable portion 211 of the display device 2 such that the first surface 121 of the touch-control glass 12 can be served as a touch-control interface. Thus, the user can view the viewable portion 211 of the display device 2 by viewing through the first surface 121 of the touch-control glass 12, such that the user can operate the electronic apparatus 100 via the touching the first surface 121. In other words, the electronic apparatus 100 is in a tablet PC mode, and is used as one tablet PC.

Specifically, when the electrical connector 22 of the display device 2 is inserted into the first connector 1142 through the first insertable opening 1114, the touch-control socket device 1 and the display device 2 have a coupling structure for maintaining the relative position between the touch-control socket device 1 and the display device 2, and the coupling structure is disclosed as follows. The inserting end portion 212 of the display device 2 is received in the inserted slot 1113 of the socket 11 and abuts the buffering pads 113. The two positioning pillars 23 are respectively inserted into the two first positioning slots 1115 such that the inner wall of the first positioning slots 1115 press against the elastic arms 231, and the protrusions 232 are respectively received in the notches 1115a of the first positioning slots 1115. Moreover, the first magnetic members 1151 are respectively and magnetically coupling to the first mating magnetic members 241.

Please refer to FIGS. 4 through 7, when the electrical connector 22 of the display device 2 is inserted into the second connector 1143 through the second insertable opening 1116, the display device 2 and the touch-control glass 12 are configured with a specific angle such that the first surface 121 of the touch-control glass 12 can be disposed on a working surface (e.g., tabletop) and the second surface 122 of the touch-control glass 12 can be served as a touch-control interface. The specific angle is ninety degrees, but is not limited thereto. For example, the specific angle can be adjusted by designer's demand, and the preferable range of the specific angle is about 85~120 degrees. Thus, the user can directly view the viewable portion 211 of the display device 2, and the user can operate the electronic apparatus 100 by touch-control of the second surface 122. In other words, the second surface 122 is similarly used as a mouse pad, the electronic apparatus 100 is in a notebook PC mode, and the electronic apparatus 100 is similarly used as the notebook PC well known in the art.

Specifically, when the electrical connector 22 of the display device 2 is inserted into the second connector 1143 through the second insertable opening 1116, the touch-control socket device 1 and the display device 2 have some coupling structure for maintaining the relative position of the touch-control socket device 1 and the display device 2, and the said coupling structure is disclosed as follows. The inserting end portion 212 of the display device 2 abuts on the second elongated surface 1112 of the socket 11. The positioning pillars 23 are respectively inserted into the second positioning slots 1117, and the protrusions 232 are respectively received in the notches 1117a of the second positioning slots 1117 such that the inner wall of the first positioning slots 1115 press against the elastic arms 231,. Moreover, the second magnetic members 1152 are respectively and magnetically coupling to the second mating magnetic members 242.

Figure 8:
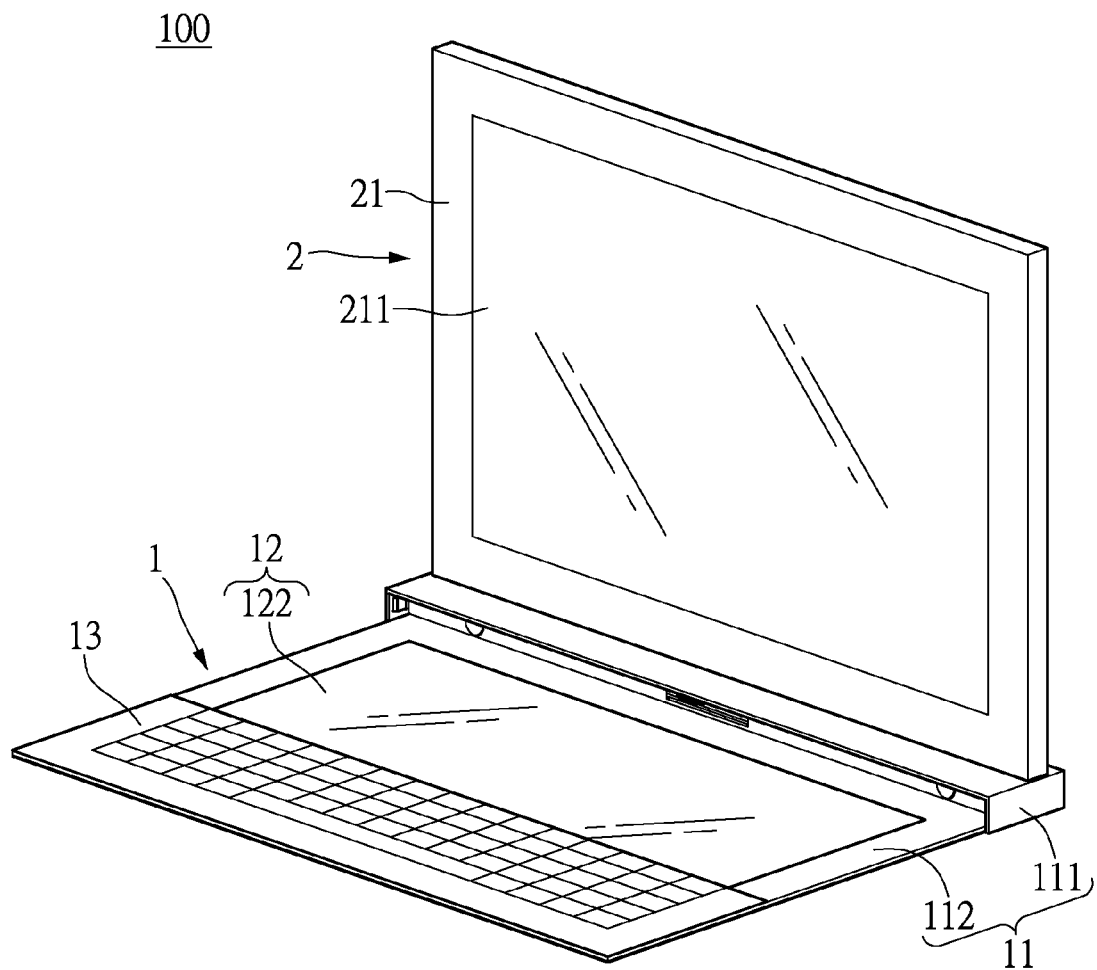
FIG. 8 is a perspective view showing the first embodiment of the electronic apparatus according to the instant disclosure, in which the electronic apparatus is in the notebook PC mode having a key indicating film.

Specifically as shown in FIG. 8, the second surface 122 can be programmed to have a plurality of touch-control key segments. The touch-control socket device 1 further includes a key indicating film 13. The key indicating film 13 is disposed on the second surface 122 of the touch-control glass 12 and coupled with the touch-control key segments of the second surface 122 such that the key indicating film 13 and the touch-control key segments of the second surface 122 cooperate as a touch-control keyboard.

Second Embodiment

Figure 9:
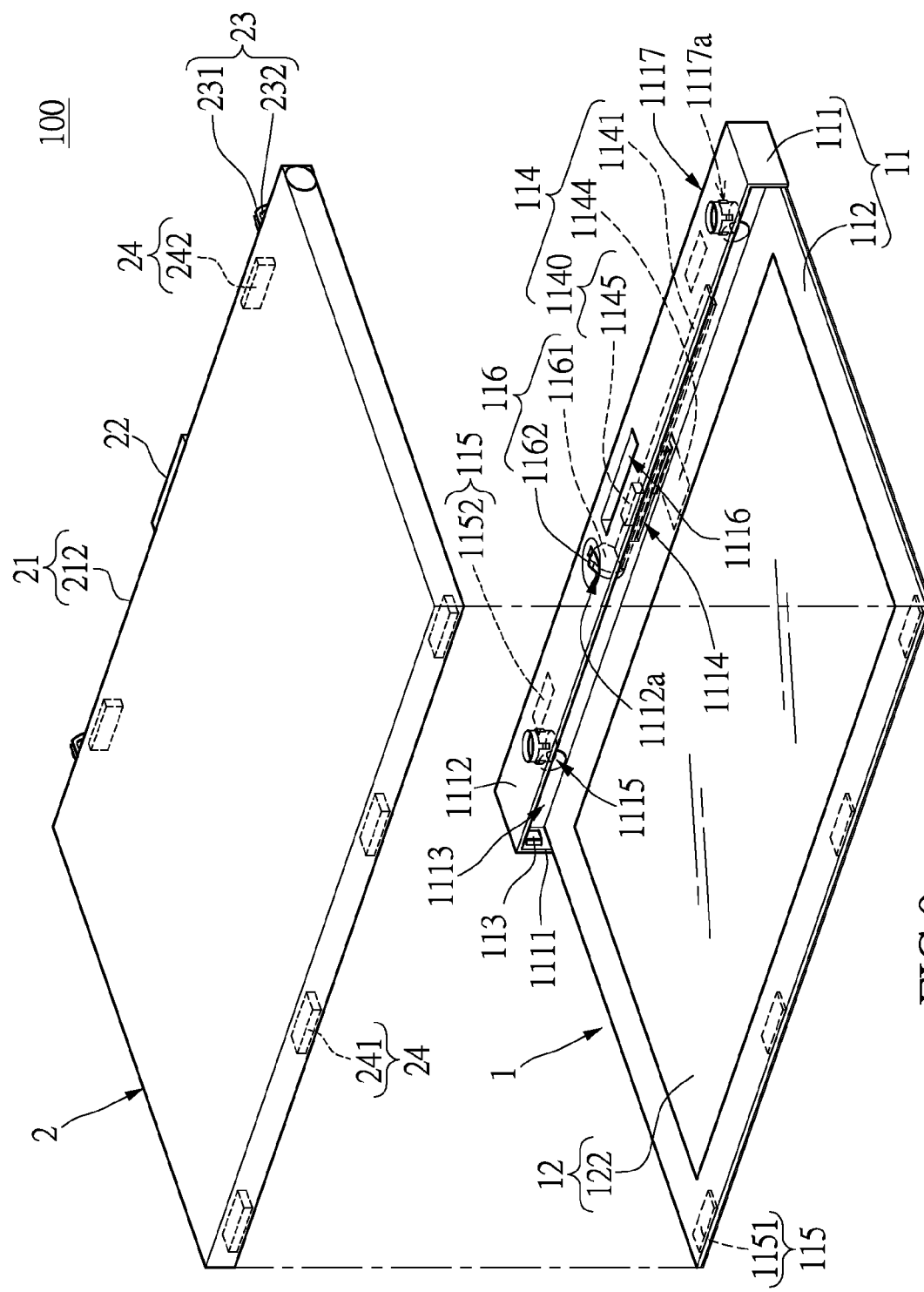
FIG. 9 is a perspective view showing a second embodiment of the electronic apparatus according to the instant disclosure.
Figure 10:
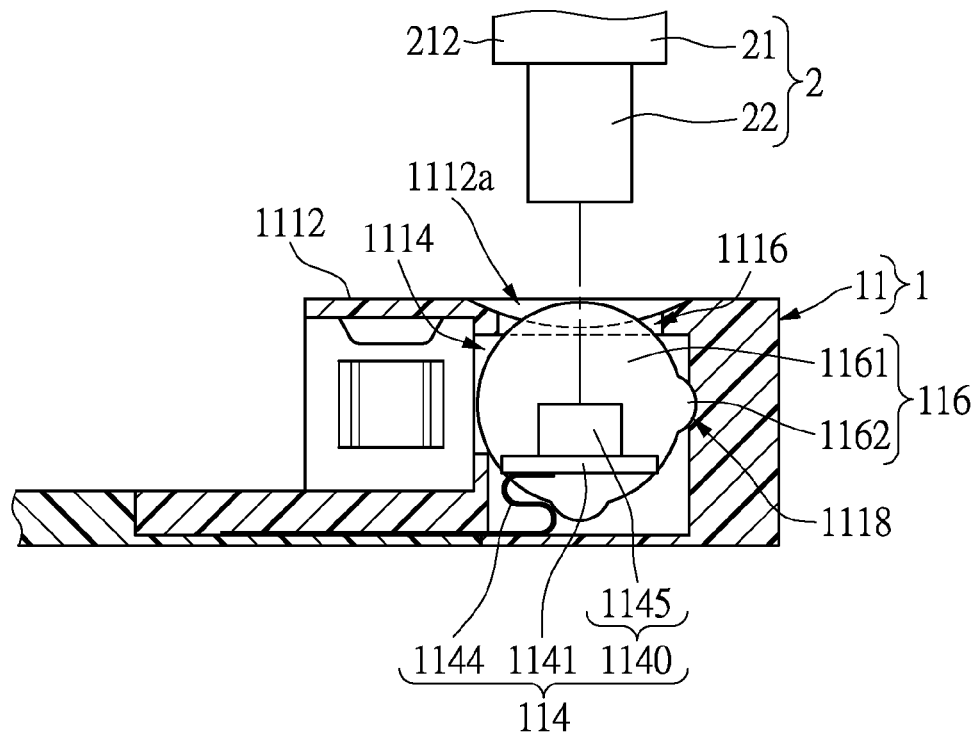
FIG. 10 is a cross-sectional view showing the second embodiment of the electronic apparatus according to the instant disclosure, in which the electronic apparatus is in the notebook PC mode.
Figure 11:
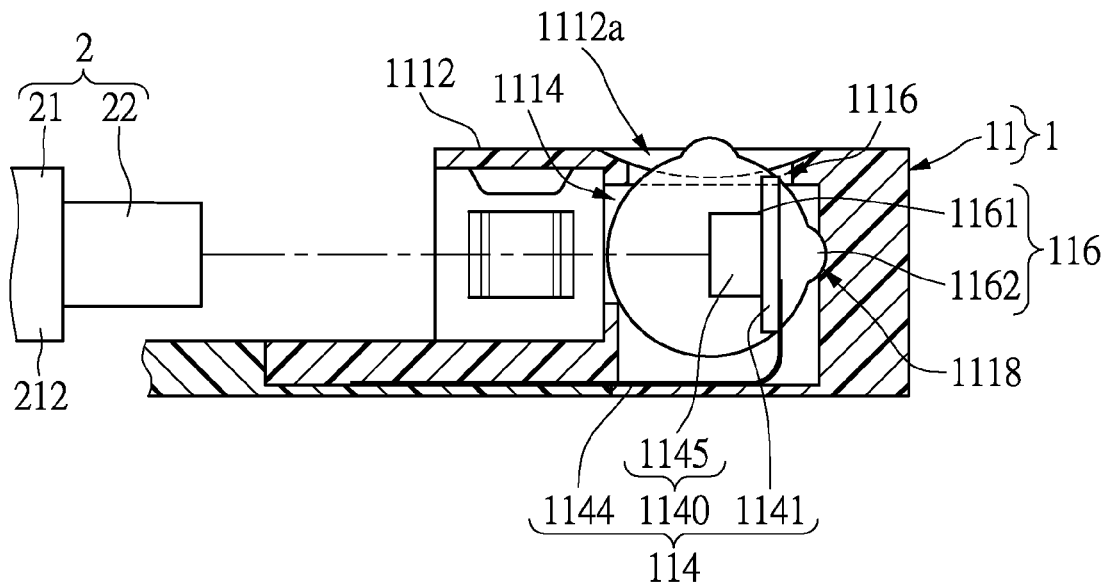
FIG. 11 is a cross-sectional view showing the second embodiment of the electronic apparatus according to the instant disclosure, in which the electronic apparatus is in the tablet PC mode.

Please refer to FIGS. 9 through 11 as a second embodiment of the instant disclosure. This embodiment is similar to the first embodiment, and the identical features are not disclosed again. The difference between this embodiment and the first embodiment is the socket 11 of the touch-control socket device 1, which is disclosed as follows.

The second elongate surface 1112 of the seat 111 has an operated slot 1112a arranged adjacent to the second insertable opening 1116. The connecting module 1140 in the instant embodiment is a rotatable connector 1145 for example, and the rotatable connector 1145 is formed upright on the circuit board 1141. The rotatable connector 1145 may also be lain on the circuit board 1141.

Moreover, the seat 11 further includes an adjustable unit 116. The adjustable unit 116 is installed on the circuit unit 114, and portions of the adjustable unit 116 are exposed from the operated slot 1112a. The rotatable connector 1145 is selectively rotated to align with the first insertable opening 1114 or the second insertable opening 1116 by operating the adjustable unit 116.

The adjustable unit 116 in the instant embodiment is a round rotatable plate 1161 for example, but is not limited to the instant embodiment. The rotatable plate 1161 is fixed on a lateral edge of the circuit board 1141, and portions of the rotatable plate 1161 are exposed from the operated slot 1112a in order to provide user controlled operations. Moreover, the exposed portion of the rotatable plate 1161 is protrudingly formed to not exceed the second elongated surface 1112 in order to prevent interference between the inserting end portion 212 and the exposed portion of the rotatable plate 1161 when the electronic apparatus 100 is in the notebook PC mode. Thus, the inserted opening of the rotatable connector 1145 is selectively rotated to align with the first insertable opening 1114 or the second insertable opening 1116 by rotating the exposed portion of the rotatable plate 1161.

Specifically, when the inserted opening of the rotatable connector 1145 is rotated to align with the first insertable opening 1114 as shown in FIG. 10, the electrical connector 22 of the display device 2 is inserted into the rotatable connector 1145 through the first insertable opening 1114 such that the electronic apparatus 100 is in the notebook PC mode, and the electronic apparatus 100 is used as a notebook PC. Alternatively, when the inserted opening of the rotatable connector 1145 is rotated to align with the second insertable opening 1116 as shown in FIG. 11, the electrical connector 22 of the display device 2 is inserted into the rotatable connector 1145 through the second insertable opening 1116 such that the electronic apparatus 100 is in the tablet PC mode, and the electronic apparatus 100 is used as a tablet PC.

Moreover, the rotatable plate 1161 and a portion of the seat 111 adjacent to the rotatable plate 1161 each has a positioning structure for fixing the relative position between the rotatable plate 1161 and the seat 111. For example, the rotatable plate 1161 has a convex portion 1162. The seat 111 has a recess 1118 conforming to the shape of the convex portion 1162 such that when the inserted opening 1113 of the rotatable connector 1145 is rotated to align with the first insertable opening 1114 or the second insertable opening 1116, the relative position between the rotatable plate 1161 and the seat 111 can be maintained by the engagement of the convex portion 1162 and the recess 1118. However, the positioning structure of the rotatable plate 1161 and the positioning structure of the seat 111 are not limited to the instant embodiment.

The Probable Effect of the Above Embodiments

Base on the above disclosure, the instant disclosure provides the touch-control socket device having a touch-control glass capable of an adjustable application mode different from the past. The display device is selectively inserted into the connecting module of the touch-control socket device through the first insertable opening or the second insertable opening, such that the first and the second surfaces of the touch-control glass are selectively used as a touch-control interface. Thus, two different usage modes of the electronic apparatus (e.g., the tablet PC mode or the notebook PC mode) are provided.

Moreover, the touch-control socket device has a plurality of structural elements which maintain the connection between the display device and the touch-control socket device such as the inserted slot, the buffering pads, the first positioning slots, the second positioning slots, and magnetic unit. The display device has a plurality of structural elements which couple to the structural elements of the touch-control socket device. Thus, when the display device is installed on the connecting module, the relative position between the display device and the touch-control socket device can be maintained by the connection between the structural elements of touch-control socket device and the corresponding structural elements of the display device.

Additionally, the touch-control socket device can be used as the touch-control keyboard by the combination of the key indicating film and the second surface of the touch-control glass.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. An electronic apparatus, comprising:
    a touch-control socket device, comprising:
        a socket having a seat, a frame extended from the seat, and a connecting module disposed in the seat, the seat having a first insertable opening and a second insertable opening facing two different directions; and
        a touch-control glass fixed on the frame and electrically connected to the connecting module, and the touch-control glass has a first surface and an opposite second surface; and
    a display device defining a viewable portion, the display device having an electrical connector selectively inserted through the first insertable opening or the second insertable opening and into the connecting module;
    wherein when the electrical connector is inserted into the connecting module through the first insertable opening, the display device is configured in parallel with and overlaps the touch-control glass, the second surface of the touch-control glass substantially superimposes the viewable portion of the display device such that the first surface of the touch-control glass is served as a touch-control interface, and wherein when the electrical connector is inserted into the connecting module through the second insertable opening, the display device and the touch-control glass are configured with a specific angle therebetween such that the first surface of the touch-control glass is disposed on a working surface and the second surface of the touch-control glass is served as a touch-control interface.

2. The electronic apparatus as claimed in claim 1, wherein the connecting module has a first connector and a second connector, the first connector is exposed from the first insertable opening and the second connector is exposed from the second insertable opening such that the electrical connector of the display device is selectively inserted through the first insertable opening and into the first connector or through the second insertable opening and into the second connector.

3. The electronic apparatus as claimed in claim 2, wherein the seat of the socket has an inserted slot having the first insertable opening formed on a bottom portion thereof, one end portion of the display device having the electrical connector is defined as an inserting end portion, and when the electrical connector of the display device is inserted into the connecting module through the first insertable opening, the inserting end portion is received in the inserted slot of the socket.

4. The electronic apparatus as claimed in claim 3, wherein the socket further includes at least one buffering pad disposed on an inner lateral side of the inserted slot, and when the electrical connector of the display device is inserted into the connecting module through the first insertable opening, the inserting end portion abuts on the buffering pad.

5. The electronic apparatus as claimed in claim 2, wherein the socket has two first positioning slots and two second positioning slots, the first positioning slots are respectively arranged at two opposite ends of the first insertable opening, the second positioning slots are respectively arranged at two opposite ends of the second insertable opening, the display device has two positioning pillars respectively configured at two opposite ends of the electrical connector, when the electrical connector of the display device is inserted into the connecting module through the first insertable opening, the positioning pillars respectively insert into the first positioning slots, and when the electrical connector of the display device is inserted into the connecting module through the second insertable opening, the positioning pillars are respectively inserted into the second positioning slots, thereby maintaining the relative position between the display device and the socket.

6. The electronic apparatus as claimed in claim 5, wherein the first positioning slots and the second positioning slots each has a plurality of notches formed on an inner wall thereof, each positioning pillar has a plurality of elongated elastic arms configured in an annular shaped array and a plurality of protrusions each outwardly extended from each of the the elastic arms, any two adjacent elastic arms of each positioning pillar are configured with a predetermined distance therebetween, when the electrical connector of the display device is inserted into the connecting module through the first insertable opening, the protrusions are respectively received in the notches of the first positioning slots, and when the electrical connector of the display device is inserted into the connecting module through the second insertable opening, the protrusions are respectively received in the notches of the second positioning slots.

7. The electronic apparatus as claimed in claim 2, wherein the socket has a magnetic unit, the display device has a mating magnetic unit, and when the electrical connector of the display device is inserted into the connecting module through the first insertable opening or the second insertable opening, the magnetic unit of the socket and the mating magnetic unit of the display device are magnetically coupled with each other to maintain the relative position between the display device and the socket.

8. The electronic apparatus as claimed in claim 2, wherein the touch-control socket device further includes a key indicating film, when the electrical connector of the display device is inserted into the connecting module through the second insertable opening, the key indicating film is disposed on the second surface of the touch-control glass such that the key indicating film and the second surface of the touch-control glass cooperate as a touch-control keyboard.

9. The electronic apparatus as claimed in claim 1, wherein the seat further includes an adjustable unit, the connecting module has a rotatable connector, and the rotatable connector is selectively rotated to align with the first insertable opening or the second insertable opening by operating the adjustable unit.

10. The electronic apparatus as claimed in claim 9, wherein the seat of the socket has an inserted slot having the first insertable opening formed on a bottom portion thereof, one end portion of the display device having the electrical connector is defined as an inserting end portion, and when the electrical connector of the display device is inserted into the connecting module through the first insertable opening, the inserting end portion is received in the inserted slot of the seat.

11. The electronic apparatus as claimed in claim 10, wherein the socket further includes at least one buffering pad disposed on an inner lateral side of the inserted slot, and wherein when the electrical connector of the display device is inserted into the connecting module through the first insertable opening, the inserting end portion abuts on the buffering pad.

12. The electronic apparatus as claimed in claim 9, wherein the socket has two first positioning slots and two second positioning slots, the first positioning slots are respectively arranged at two opposite ends of the first insertable opening, the second positioning slots are respectively arranged at two opposite ends of the second insertable opening, the display device has two positioning pillars respectively configured at two opposite ends of the electrical connector, when the electrical connector of the display device is inserted into the connecting module through the first insertable opening, the positioning pillars respectively insert into the first positioning slots, and when the electrical connector of the display device is inserted into the connecting module through the second insertable opening, the positioning pillars are respectively inserted into the second positioning slots, thereby maintaining the relative position between the display device and the socket.

13. The electronic apparatus as claimed in claim 12, wherein the first positioning slots and the second positioning slots each has a plurality of notches formed on an inner wall thereof, each positioning pillar has a plurality of elongated elastic arms configured in an annular shape and a plurality of protrusions each outwardly extended from each of the elastic arms, and any two adjacent elastic arms of each positioning pillar are configured with a predetermined distance therebetween, when the electrical connector of the display device is inserted into the connecting module through the first insertable opening, the protrusions are respectively received in the notches of the first positioning slots, and when the electrical connector of the display device is inserted into the connecting module through the second insertable opening, the protrusions are respectively received in the notches of the second positioning slots.

14. The electronic apparatus as claimed in claim 9, wherein the socket has a magnetic unit, the display device has a mating magnetic unit, and when the electrical connector of the display device is inserted into the connecting module through the first insertable opening or the second insertable opening, the magnetic unit of the socket and the mating magnetic unit of the display device are magnetically coupled with each other for maintaining the relative position between the display device and the socket.

15. The electronic apparatus as claimed in claim 9, wherein the touch-control socket device further includes a key indicating film, when the electrical connector of the display device is inserted into the connecting module through the second insertable opening, the key indicating film is disposed on the second surface of the touch-control glass such that the key indicating film and the second surface of the touch-control glass cooperate as a touch-control keyboard.

16. The electronic apparatus as claimed in claim 1, wherein the socket has two first positioning slots and two second positioning slots, the construction of each first positioning slot is identical to the construction of each second positioning slot, the first positioning slots are respectively arranged at two opposite ends of the first insertable opening, the second positioning slots are respectively arranged at two opposite ends of the second insertable opening, and the distance between each first positioning slot and the first insertable opening is equal to the distance between each second positioning slot and the second insertable opening.

17. The electronic apparatus as claimed in claim 1, wherein the specific angle is ninety degrees.

* * * * *